(12) United States Patent
Hewitt

(10) Patent No.: US 6,921,304 B2
(45) Date of Patent: Jul. 26, 2005

(54) AMPHIBIOUS VEHICLE

(76) Inventor: Stanley C. Hewitt, P.O. Box 7100, Ketchikan, AK (US) 99901

( * ) Notice: Subject to any disclaimer, the term of this patent is extended or adjusted under 35 U.S.C. 154(b) by 0 days.

(21) Appl. No.: 10/760,588

(22) Filed: Jan. 21, 2004

(65) Prior Publication Data

US 2005/0003715 A1 Jan. 6, 2005

Related U.S. Application Data

(63) Continuation-in-part of application No. 10/463,436, filed on Jun. 18, 2003, now abandoned.

(51) Int. Cl.$^7$ .......................... B60F 3/00; B62D 55/00
(52) U.S. Cl. ............................ 440/12.52; 440/12.51; 440/12.56; 440/12.63; 305/120; 305/124
(58) Field of Search ..................... 440/12.52, 12.53, 440/12.54, 5, 12.5, 12.51, 12.63, 12.64, 12.56; 180/6.7, 9.1, 9.21, 9.26, 9.48, 184, 190–193; 305/116, 120, 124, 127, 139

(56) References Cited

U.S. PATENT DOCUMENTS

| | | | |
|---|---|---|---|
| 1,355,853 A | | 10/1920 | Habsburg-Lothringen |
| 1,729,374 A | | 9/1929 | Ehrhart |
| 2,586,218 A | | 2/1952 | Gazda |
| 2,853,812 A | | 9/1958 | Van Riet et al. |
| 3,095,938 A | * | 7/1963 | Bertelsen .................... 180/119 |
| 3,207,245 A | | 9/1965 | Weiland |
| 3,299,849 A | | 1/1967 | Pitchford |
| 3,306,250 A | | 2/1967 | Pitchford |
| 3,487,802 A | * | 1/1970 | Roy ........................ 440/12.54 |
| 3,645,349 A | * | 2/1972 | Nichter ..................... 180/6.48 |
| 3,724,397 A | * | 4/1973 | Sargent ..................... 180/9.54 |
| 4,008,679 A | | 2/1977 | Bozzano |
| 4,083,610 A | * | 4/1978 | Kruchowski ................ 305/139 |
| 4,591,015 A | | 5/1986 | Korppoo et al. |
| 4,658,751 A | | 4/1987 | Koot |
| 4,961,395 A | * | 10/1990 | Coast ....................... 440/12.64 |
| 5,181,478 A | * | 1/1993 | Berardi .................... 440/12.54 |
| 5,199,372 A | * | 4/1993 | Seligman et al. ........... 114/344 |
| 5,287,938 A | | 2/1994 | Welling |
| 5,400,734 A | | 3/1995 | Doyon |
| 5,839,802 A | * | 11/1998 | Sheets ........................ 305/52 |
| 6,076,619 A | * | 6/2000 | Hammer .................... 180/6.48 |

FOREIGN PATENT DOCUMENTS

DE             0647798          8/1937

* cited by examiner

*Primary Examiner*—S. Joseph Morano
*Assistant Examiner*—Ajay Vasudeva
(74) *Attorney, Agent, or Firm*—Richard C. Litman

(57) ABSTRACT

The amphibious vehicle is a motorized vehicle capable of travel on land as well as in the water. The amphibious vehicle has a boat-like hull, and a caterpillar track assembly mounted along each side by hinges. The tracks are arranged so that they can be rotated between a lowered position, where they support the amphibious vehicle and provide traction and propulsion during land operation, and a raised position, where they rest vertically on or above the hull's deck during marine operation. With the caterpillar track assemblies in the raised position, the caterpillar track assemblies are fully removed from the water to improve performance and maneuverability. Additionally, with the tracks in their upright position the overall width of the amphibious vehicle is narrowed to facilitate trailering. The tracks employ hydraulic motors in a direct drive configuration for propulsion, reducing weight and complexity of the tracks.

18 Claims, 11 Drawing Sheets

AMPHIBIOUS VEHICLE

CROSS-REFERENCE TO RELATED APPLICATION

This application is a continuation-in-part of U.S. patent application Ser. No. 10/463,436, filed Jun. 18, 2003, now abandoned.

BACKGROUND OF THE INVENTION

1. Field of the Invention

The present invention relates to amphibious vehicles. More specifically, the present invention relates to an amphibious vehicle having a buoyant hull with a track drive assembly, or a wheeled drive assembly, mounted on each side of the hull and hinged so that the drive assemblies can be pivoted upward and stowed on or above the deck, or pivoted downward into a driving position. When the drive assemblies are stowed in their upright position, they are positioned above the waterline and out of water flow so that the boat hull is cleaned up for optimal marine performance.

2. Description of the Related Art

Amphibious vehicles are known which are capable of providing transportation either in water or on land. Useful in areas with many bodies of water, such as lakes, rivers, swamps, and the like, an amphibious vehicle allows its operator to travel across land and, upon reaching the edge of a body of water, proceed into the water and continue on.

Many amphibious vehicles use a driving assembly, typically an assembly of wheels or caterpillar tracks that is fixed in position and cannot be retracted from the water during marine operation. The inability to remove the driving assembly from the water means that the amphibious vehicle cannot be operated at a high speed in the water because of the high drag caused by the submerged driving assembly. Maneuverability in the water is also compromised by the additional drag.

U.S. Pat. No. 3,487,802, issued on Feb. 7, 1968 to L. Roy, discloses an amphibious boat. The boat hull has a caterpillar track assembly on each side. The track assemblies can be raised and lowered vertically along each side of the hull. The track assemblies are raised during marine operation, and lowered for operation on land. During marine operation, the tracks are raised above the bottom of the hull. The tracks do not appear, however, to rise above the waterline. With the tracks still somewhat submersed in the water during marine operation, the resulting drag will prevent the amphibious boat from reaching its optimum marine performance.

U.S. Pat. No. 2,853,812, issued on Sep. 30, 1958 to A. Van Riet et al., discloses an amphibious vehicle having tractor treads alongside a shallow draft boat hull. The tractor treads can be raised and lowered vertically along each side of the hull. The tractor treads are raised during marine operation, and lowered for operation on land.

German Patent No. 647,798, published Jul. 13, 1937, discloses another amphibious vehicle that employs track drive assemblies along each side of a floating hull. Again, the tracks are vertically raised and lowered alongside the hull.

The width of the amphibious vehicle, with tracks mounted along side, presents certain limitations to use of the vehicle. One such limitation is found if the vehicle is to be trailered. Federal highway regulations limit the width of a vehicle that may be operated, or trailered, on roadways. It is desirable, for such operations, that the track assemblies of an amphibious vehicle be retractable to meet such a restriction without compromising the vehicle's aquatic performance by employing an overly narrow hull. Additionally, it may be desirable to configure the vehicle, during marine use, to a narrower width for docking and other purposes. The Roy, Van Riet, and German '798 vehicles use tracks that are raised vertically alongside the vehicle hull, thereby maintaining a constant overall vehicle width regardless of the track positions, with no capability to reduce the vehicle width.

U.S. Pat. No. 3,095,938, issued on Jul. 2, 1963 to W. Bertelsen, illustrates a ground effect vehicle having a drive track mechanism along each side of the vehicle. The vehicle can be supported and propelled by the drive tracks or, as a ground effect vehicle, by a cushion of air beneath the vehicle. The drive tracks are tilted slightly to raise the tracks' lower surface away from ground contact. This arrangement, however, leaves the vehicle with an increased width when the tracks are raised.

U.S. Pat. No. 5,181,478, issued on January 26 to S. Berardi, discloses an amphibious vehicle with a retractable drive assembly. A wheel, or caterpillar track, drive assembly is mounted on each side of the vehicle's hull. The drive assemblies can be retracted into chambers within the hull. With the drive assemblies retracted within the chambers, the chamber doors are closed. Water is pumped from the closed chambers to reduce the vehicle weight. While this approach leaves the hull cleaned up for improved marine performance, it is a relatively complex solution. The mechanically operated chamber doors must be operated in concert with the retracting wheels, and a good door seal is required to prevent water from reentering the chambers and weighting the vehicle.

U.S. Pat. No. 2,586,218, issued to A. Gazda on Feb. 19, 1952, discloses a pontoon, such as for seaplanes, sea-sleds, boat hulls, flying boats, and the like, having an endless track member retractably disposed within the pontoon. While a bevel-gear and belt mechanism is illustrated to provide drive power to the track, no power source or drive train is illustrated or disclosed. As a component of an aircraft landing gear, the track functions un-powered, with the aircraft propelled by its propeller as if on ordinary wheeled landing gear.

U.S. Pat. No. 5,400,734, issued on Mar. 28, 1995 to P. Doyon, discloses another amphibious vehicle. The Doyon amphibious vehicle employs tracks with conventional wheels that are removably mounted to the tracks. The tracks, however, are fixed. No provision is made to remove the tracks from the water, or otherwise reduce their drag, during marine operation.

Additional amphibious, and ground effect, vehicles capable of operation on both land and water are disclosed in U.S. Pat. No. 3,207,245, issued on Sep. 21, 1965 to C. Wieland, U.S. Pat. No. 3,299,849, issued on Jan. 24, 1967 to A. Pitchford, U.S. Pat. No. 3,306,250, issued on February 28 to A. Pitchford, U.S. Pat. No. 4,008,679, issued on Feb. 22, 1977 to S. Bozzano, U.S. Pat. No. 4,591,015, issued on May 27, 1986 to S. Korppoo et al., and U.S. Pat. No. 4,658,751, issued on Apr. 21, 1987 to B. Koot. U.S. Pat. Nos. 1,355,853, 1,729,374, and 5,287,938 describe additional vehicles employing a track drive assembly or arrangement for propulsion.

None of the above inventions and patents, taken either singly or in combination, is seen to describe the instant invention as claimed. Thus an amphibious vehicle solving the aforementioned problems is desired.

SUMMARY OF THE INVENTION

The amphibious vehicle is a motorized vehicle capable of travel on land as well as in the water. The amphibious vehicle has a boat-like hull, and a caterpillar track assembly mounted along each side. The amphibious vehicle is propelled by a conventional marine outdrive during marine operation, and by the hydraulically driven caterpillar track assemblies while operated on land.

The caterpillar track assemblies are mounted along the sides of the hull by hinges, and are arranged so that they can be rotated between a lowered position, where they support the amphibious vehicle and provide traction and propulsion during land operation, and a raised position, where they rest on the hull's deck during marine operation.

With the caterpillar track assemblies in the raised position, stowed on or above the hull's deck, the caterpillar track assemblies are fully removed from the water. Because drag from the caterpillar track assemblies is eliminated during marine operation, the amphibious vehicle achieves the marine performance and maneuverability of a conventional boat. Because the track assemblies rotate generally about, or offset from, an inboard edge, the track assemblies can be rotated into an upright position wherein the amphibious vehicle has a narrower overall width than with the tracks extended into their downward position.

Hydraulic rams function to move the caterpillar track assemblies between raised and lowered positions. Additionally, the rams hold the caterpillar track assemblies in their lowered position, supporting the weight of the amphibious vehicle.

The caterpillar track assemblies are hydraulically driven. A drive wheel in each of the caterpillar track assemblies employs a hydraulic motor in a direct drive configuration.

An internal combustion engine powers the amphibious vehicle. The engine drives a hydraulic system that provides power to the hydraulic motors to drive the caterpillar track assemblies during land operation. Additionally, the engine drives a conventional marine outdrive during marine operation.

Accordingly, it is a principal object of the invention to provide an amphibious vehicle with improved performance and maneuverability.

It is another object of the invention to provide an amphibious vehicle with a land-driving mechanism that is fully removed from the water during marine operation.

It is a further object of the invention to provide an amphibious vehicle with a land-driving mechanism that is powered by a hydraulic motor in a direct drive configuration.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
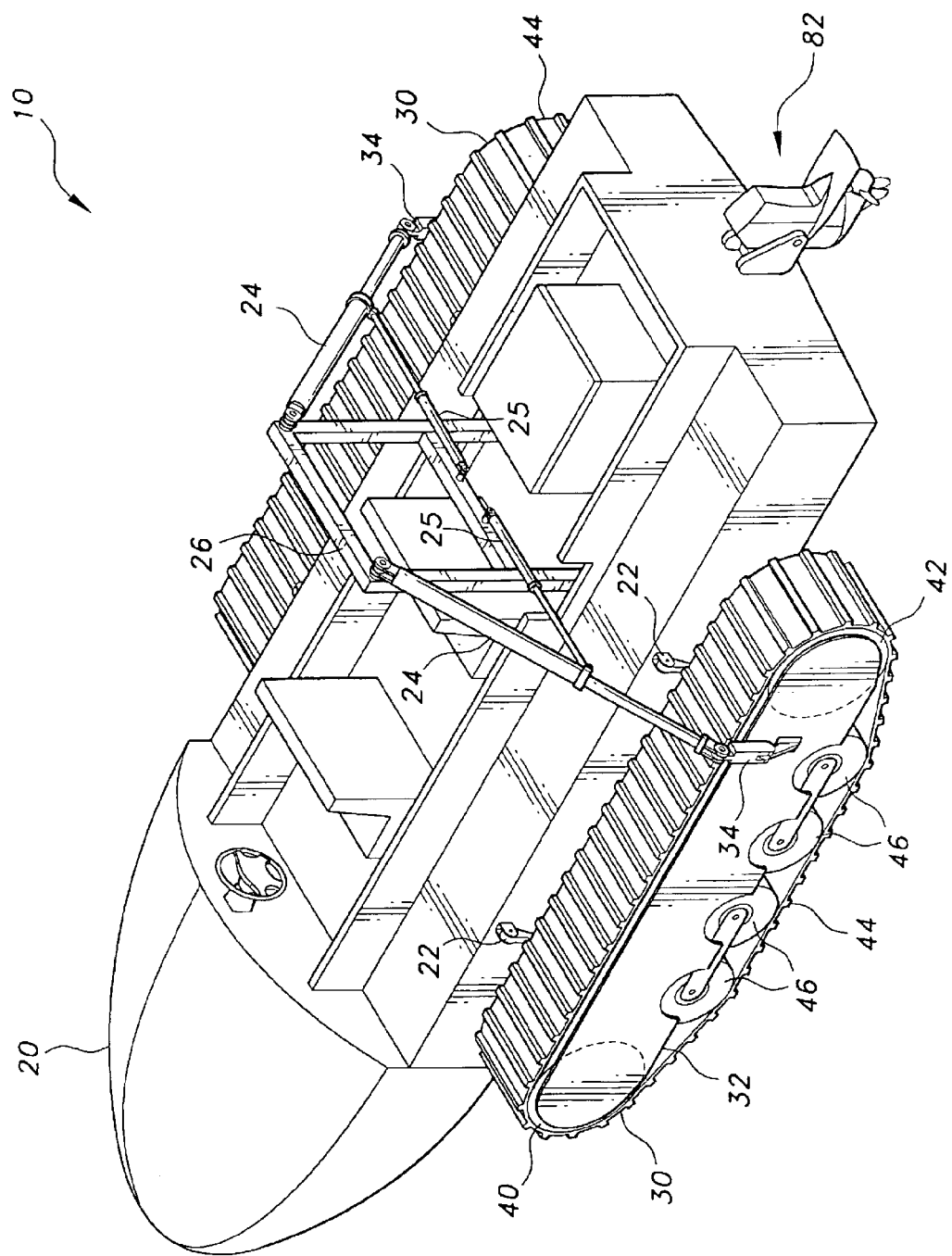
FIG. 1 is a perspective view of an amphibious vehicle according to the present invention.
Figure 2:
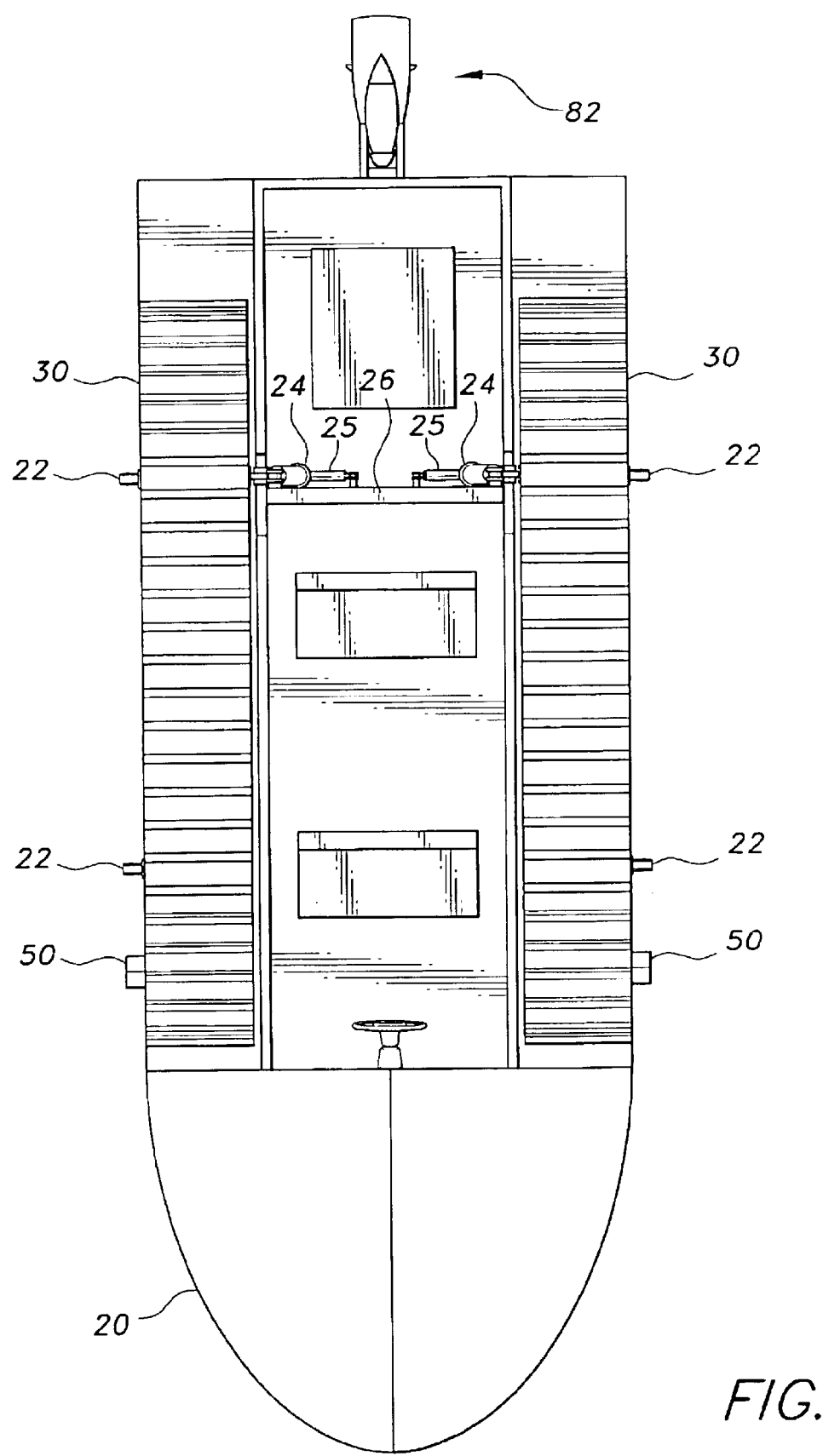
FIG. 2 is a top view of an amphibious vehicle according to the present invention, with track assemblies in their raised position, stowed on the hull deck for marine operation.
Figure 3:
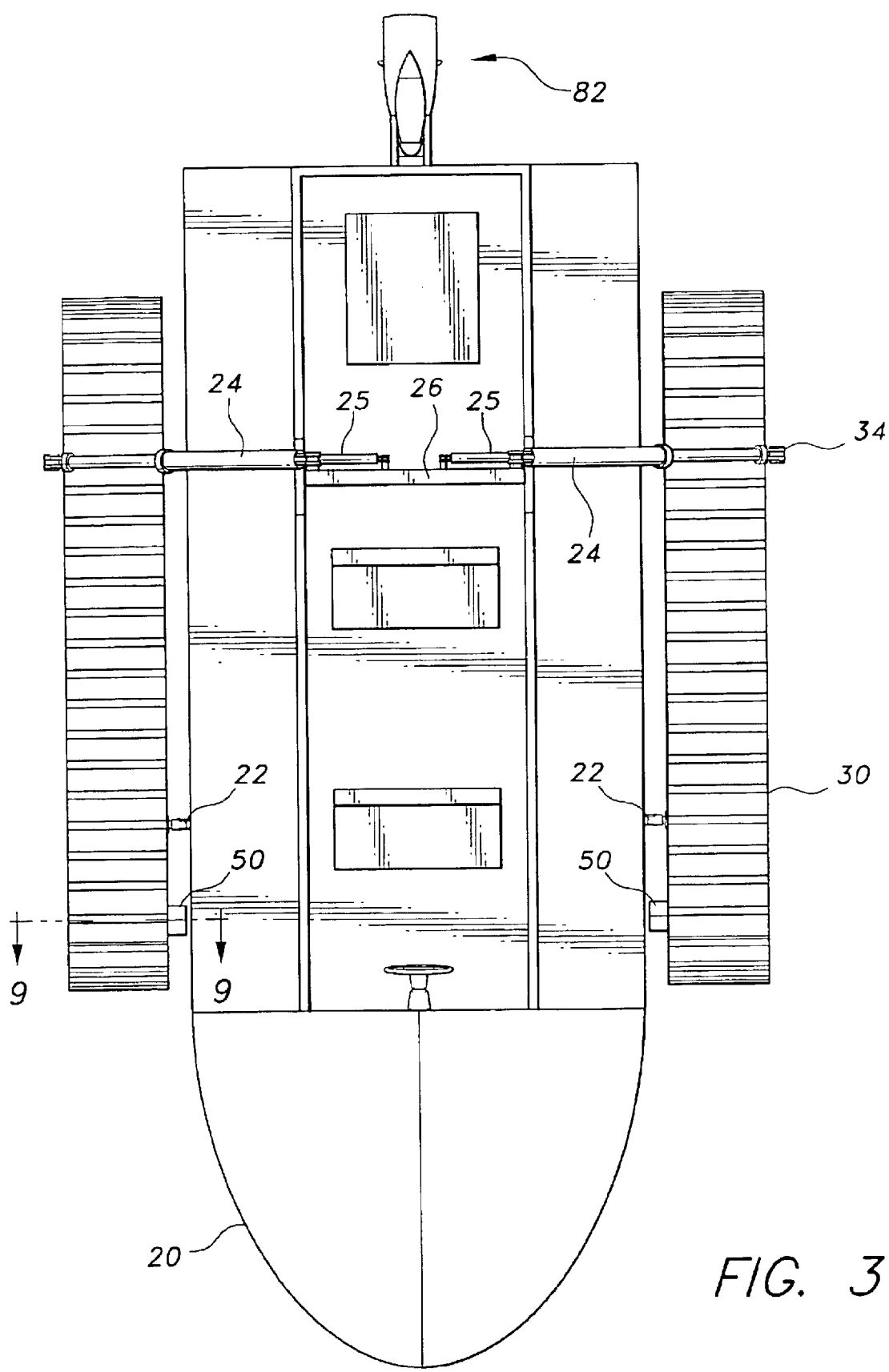
FIG. 3 is a top view of an amphibious vehicle according to the present invention, with track assemblies in their lowered position for land travel.

The present invention is an amphibious vehicle, designated generally as 10 in the drawings. Referring to FIGS. 1–3, the amphibious vehicle 10 includes a hull 20, and track assemblies 30. The track assemblies 30 are mounted longitudinally alongside the hull 20 by hinges 22. The hinges 22 allow the track assemblies 30 to be rotated between a lowered position, where they support the amphibious vehicle 10 and provide traction and propulsion during land operation, and a raised position, where they rest on the deck of the hull 20 during marine operation, clear of the waterline of the hull 20. With the track assemblies 30 clear of the waterline during marine operation, they present no drag to hinder marine performance. The track assemblies 30 provide propulsion for land operation, while a marine outdrive 82 propels the amphibious vehicle 10 during marine operation.

The track assemblies 30 are of a generally conventional construction. Outboard and inboard support members 32, 33 along the outboard and inboard sides of each track assembly 30, support a number of wheels or drums, about which an endless belt type of track 44 is entrained. A forward drum 40 or drive wheel, driven by a hydraulic motor 50 in a direct drive configuration, drives the track 44. The forward drum 40 is supported between the outboard and inboard support members 32, 33 at the forward end of the track assembly 30. A rearward idler 42 supports the track 44 at the rear of the track assembly 30. The outboard and inboard support members 32, 33 support the idler 42 at the rearward end of the track assembly 30. Four smaller drums or road wheels 46 are supported between the outboard and inboard support members 32, 33, disposed along the track assembly 30 between the forward drum 40 and the rearward drum 42. Each of the road wheels 46 may comprise a single wheel, or a tandem or multi-wheel assembly. The track assembly 30 may also include a plurality of guide wheels (not shown) disposed between the forward drum 40 and the rearward drum 42 above the road wheels 46.

The track assemblies 30 are raised and lowered by a lifting mechanism comprising hydraulic rams. The lifting mechanism for each track assembly 30 comprises a lifting member for lifting the track 30 that operates to lift the track from its downward position and rotate the track about 120° into a somewhat upright position. A pulling member then functions to pull the track 30 inward toward the hull 20, completing rotation of the track 30 of about 180° into a fully upright position. In the illustrated embodiment, the lifting and pulling members are hydraulic rams 24 and 25.

For each track assembly 30, a hydraulic ram 24 extends from a lifting bracket 34 disposed on an outer surface of the outboard support member 32 to a support frame 26. The support frame 26 is securely mounted to the hull 20, and extends above the hull 20. Thus, the hydraulic ram 24 can be configured with a first end elevated with respect to the track 30, and a second end connected to the track 30, placing the hydraulic ram 24 in a lifting position relative to the track 30. A hydraulic ram 25 has a first end connected to the support frame 26, at a position somewhat lower than the hydraulic ram 24. A second end of hydraulic ram 25 is connected to the hydraulic ram 24, with the effect that once the hydraulic ram 24 has pulled the track 30 into a somewhat upright position, the hydraulic ram 25 pulling against the hydraulic ram 24 functions to pull the track 30 the remainder of its travel into a fully upright position. The hydraulic rams 24 and 25 cooperate to rotate the track a full 180° between a vertically downward and a vertically upward position.

In the illustrated configuration, the support frame 26 has two upright posts that extend vertically from the hull 20 and a horizontal cross bar extending between the uprights. Any suitable structure on the hull 20 can be used to support the hydraulic rams 24 and 25.

Figure 4:
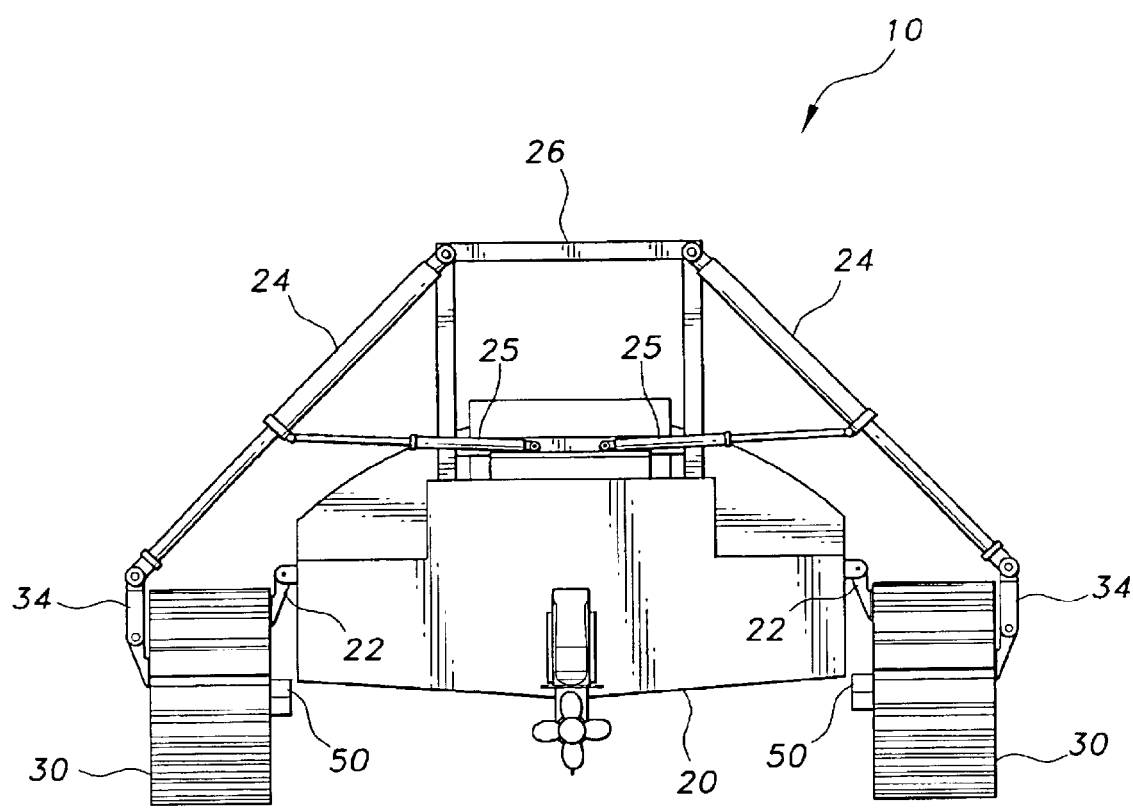
FIG. 4 is a rear view of an amphibious vehicle according to the present invention, with track assemblies lowered for land travel.
Figure 5:
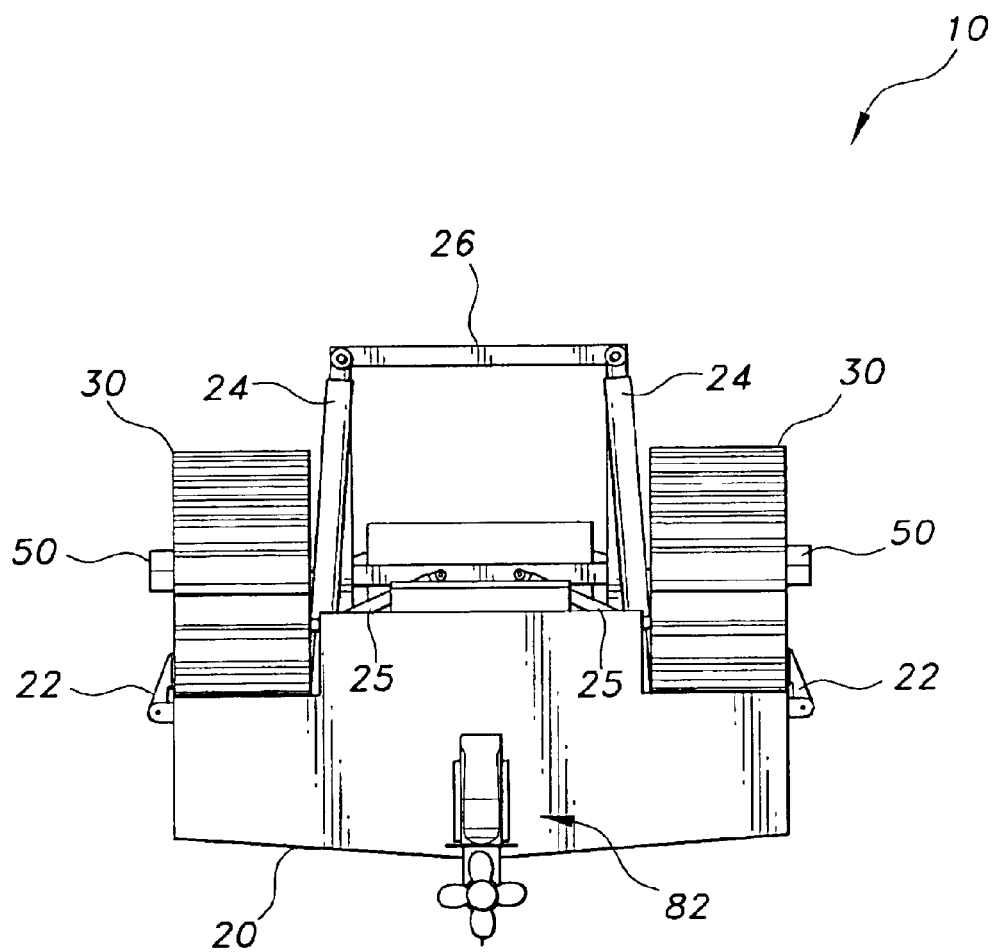
FIG. 5 is a rear view of an amphibious vehicle according to the present invention, with track assemblies in their raised position, stowed on the hull deck for marine operation.

Referring to FIGS. 4 and 5, the tracks 30 are shown in their downward position and their upright position, respectively. It can be seen that, with the hinges 22 providing a hinge point between the inboard edge of each track 30 and the hull 20 (the hinge pins being parallel to the sides of the hull 20), the tracks 30 in their upright position are moved significantly inward with respect to their downward position. This is advantageous, in that for a smaller and trailerable craft, the amphibious vehicle 10 can meet federal highway regulations for vehicle width without sacrificing hull width required for marine performance. It can also be seen, however, that interior space such as passenger or cargo space in the hull 20 is somewhat sacrificed with the tracks 30 placed in their upright position. A solution to this can be seen in FIGS. 6 and 7.

Figure 6:
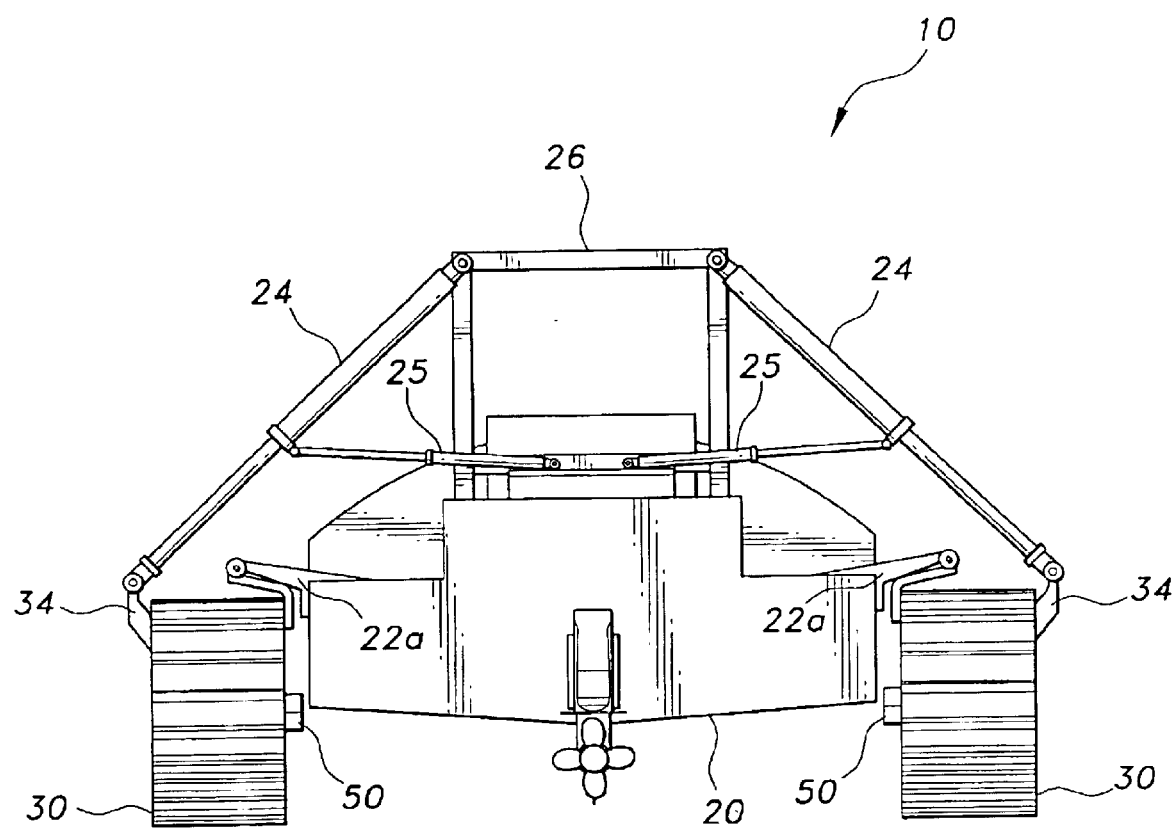
FIG. 6 is a rear view of another embodiment of an amphibious vehicle according to the present invention, with track assemblies lowered for land travel.
Figure 7:
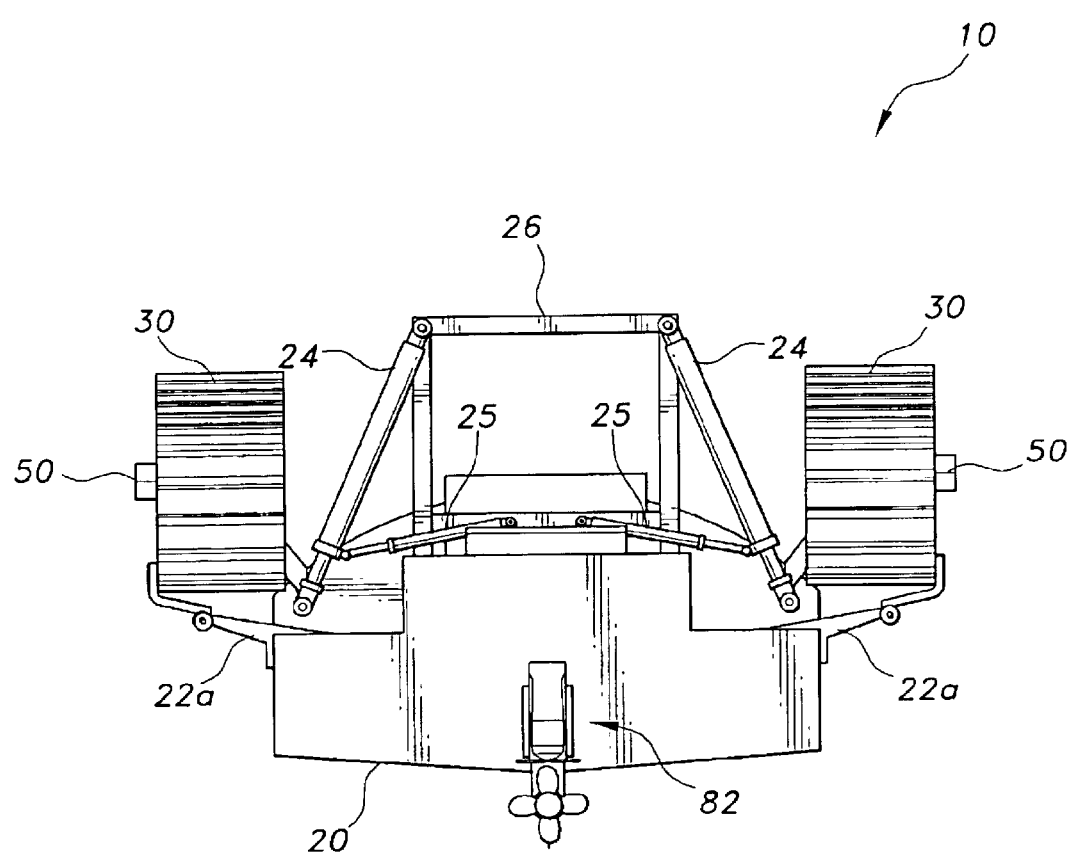
FIG. 7 is a rear view of the embodiment of an amphibious vehicle illustrated in FIG. 6, with track assemblies in their raised position, stowed on the hull deck for marine operation.

Turning to FIGS. 6 and 7, the tracks 30 are again shown in their downward position and their upright position, respectively, but in an alternate embodiment using offset hinges 22a. The offset hinges 22a provide a hinge point that is offset to a position slightly above each track 30 (the hinge pins extending parallel to the sides of the hull), and between the inboard and outboard sides of the track 30. In this configuration, rotation of the tracks 30 about the offset hinge point places the tracks 30, in their upright position, still moved inward with respect to their downward position but to a lesser degree. It can be appreciated that overall width of the amphibious vehicle 10, with the tracks 30 in the fully upright position, can be varied by varying the amount of offset of the offset hinges 22a.

Figure 8:
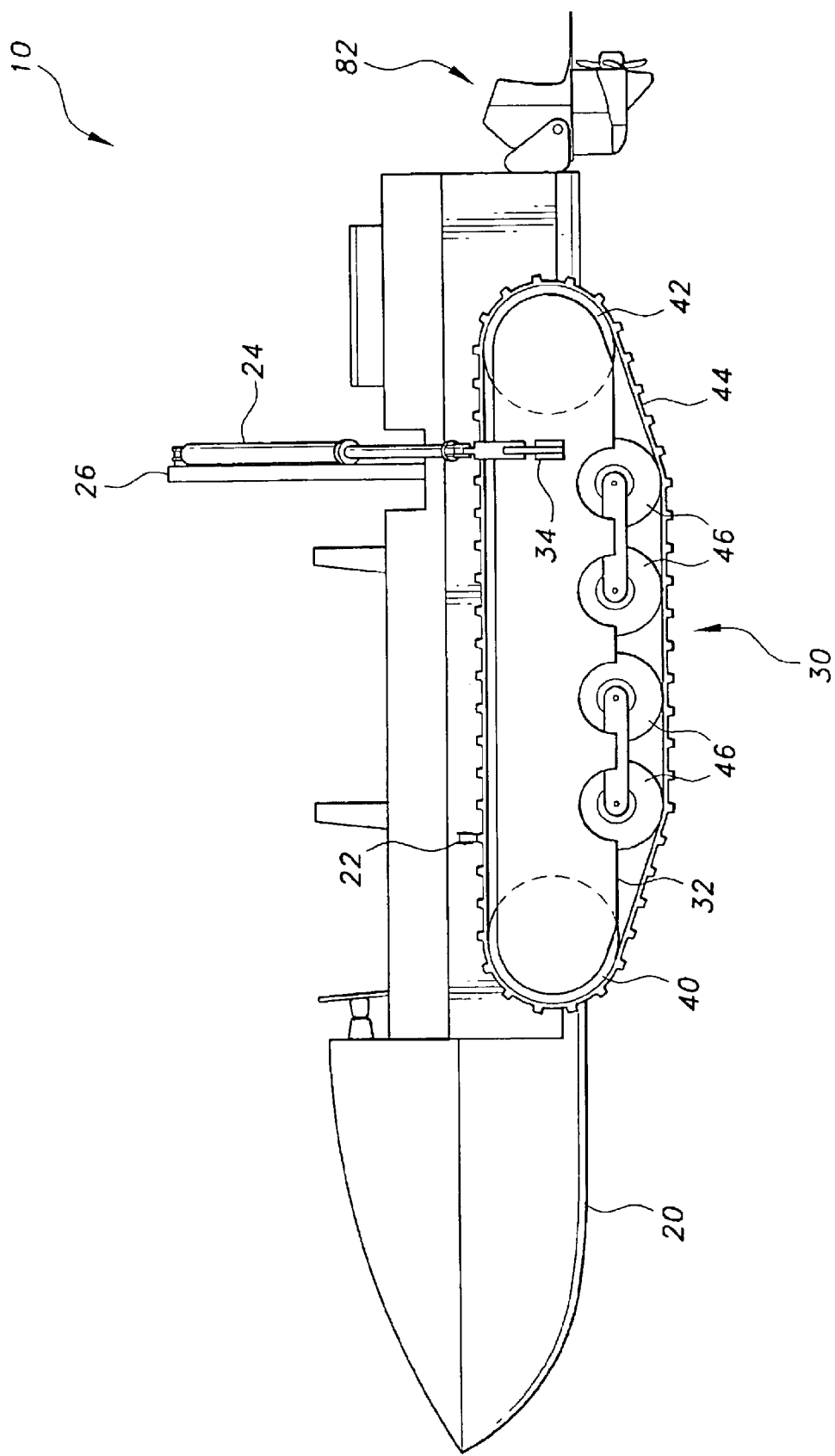
FIG. 8 is a side view of an amphibious vehicle according to the present invention with track assemblies lowered for land travel.
Figure 9:
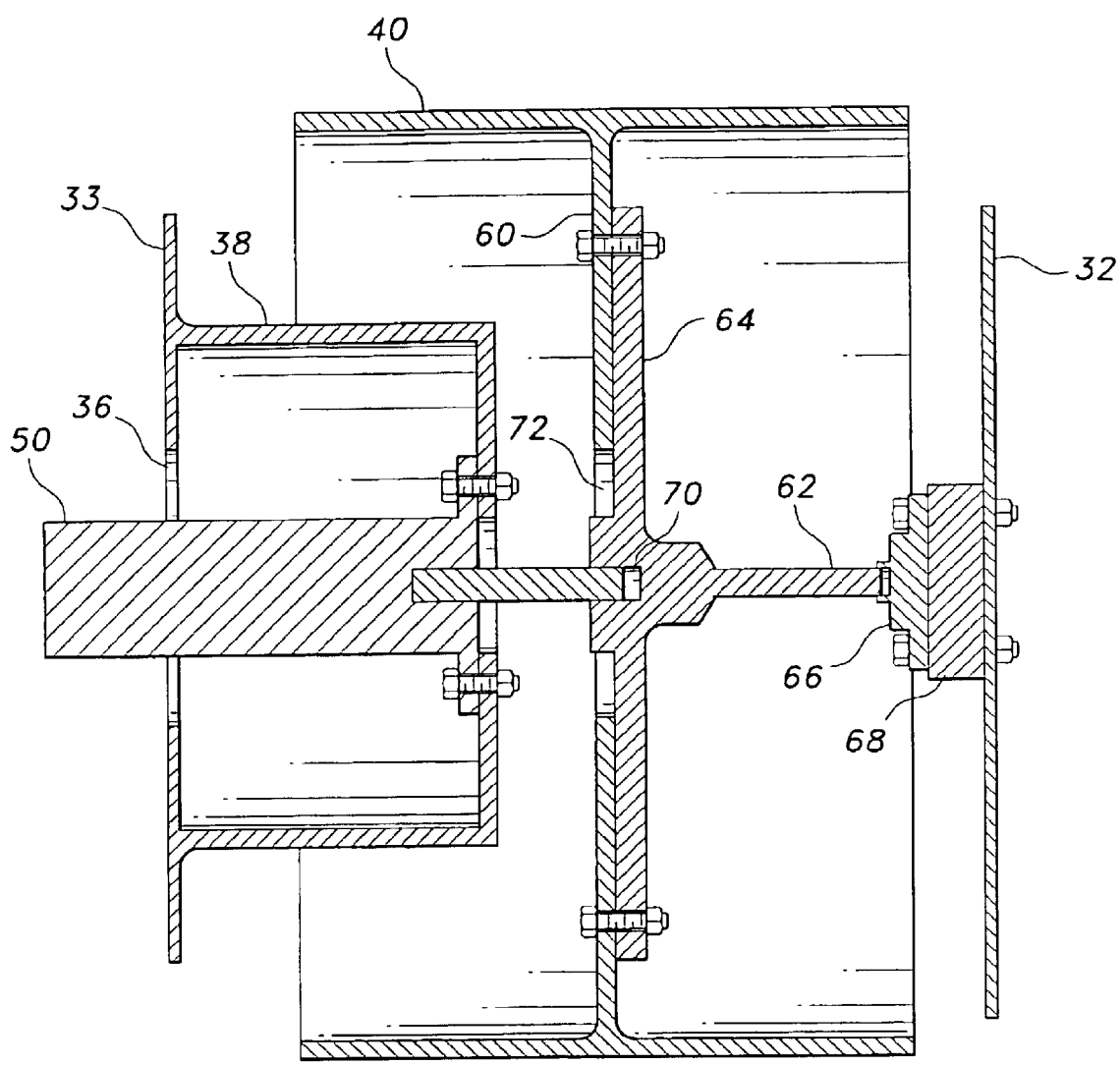
FIG. 9 is a section drawn along lines 9—9 of FIG. 3, showing the direct drive configuration of a hydraulically driven track drum.
Figure 10:
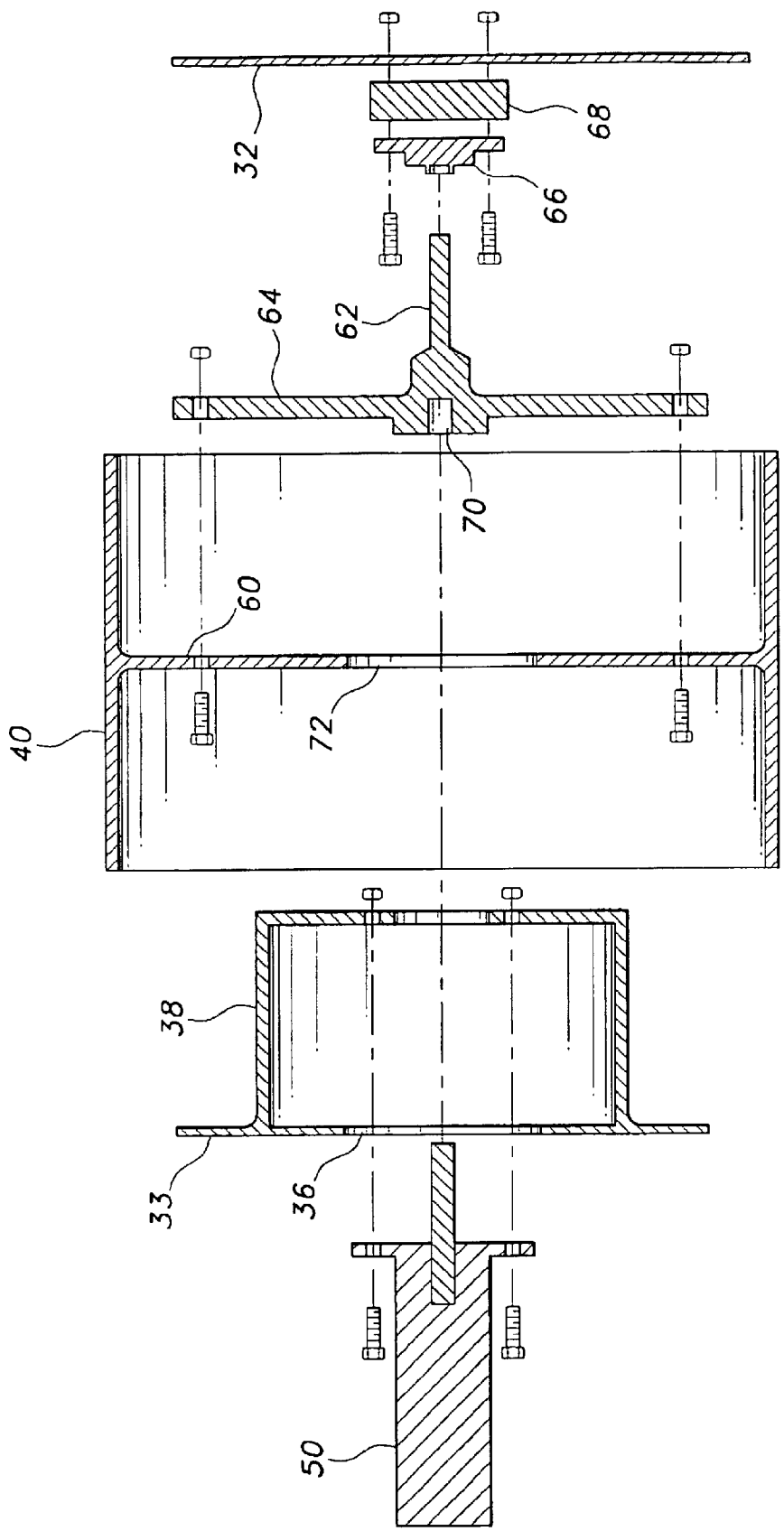
FIG. 10 is an exploded view in section of the direct drive configuration of the hydraulically driven drum of FIG. 9.

Turning to FIGS. 8–10, the forward drums 40 drive the tracks 44. A hydraulic motor 50 in a direct drive configuration drives each forward drum 40. The direct drive configuration is detailed in FIGS. 9 and 10. A motor support 38 is mounted to an inside face of inboard support member 33, and supports the hydraulic motor 50. An aperture 36 formed through the inboard support member 33 allows the body of the hydraulic motor 50 to protrude as necessary, and allows for access to the hydraulic fluid lines. The forward drum 40 has an axial support plate 60 disposed within the forward drum 40. The axial support plate 60 has a central aperture 72 formed therein. A hub plate 64 is attached to the axial support plate 60. A hub aperture 70 is formed in the center of the hub plate 64 for receiving the shaft of the hydraulic motor 50. A hub shaft 62 extends from the hub plate 64.

A bearing assembly 66 is mounted on an inside face of the outboard support member 32. A spacer 68 may be positioned between the bearing assembly 66 and the outboard support member 32. The hub plate 64 is supported between the shaft of the hydraulic motor 50 and the bearing assembly 66, with the hub shaft 62 engaged with the bearing assembly 66 and the shaft of the hydraulic motor 50 engaged with the hub aperture 70. Thus, the forward drum 40 is supported between the inboard and outboard support members 32, 33 and is driven by the hydraulic motor 50.

Figure 11:
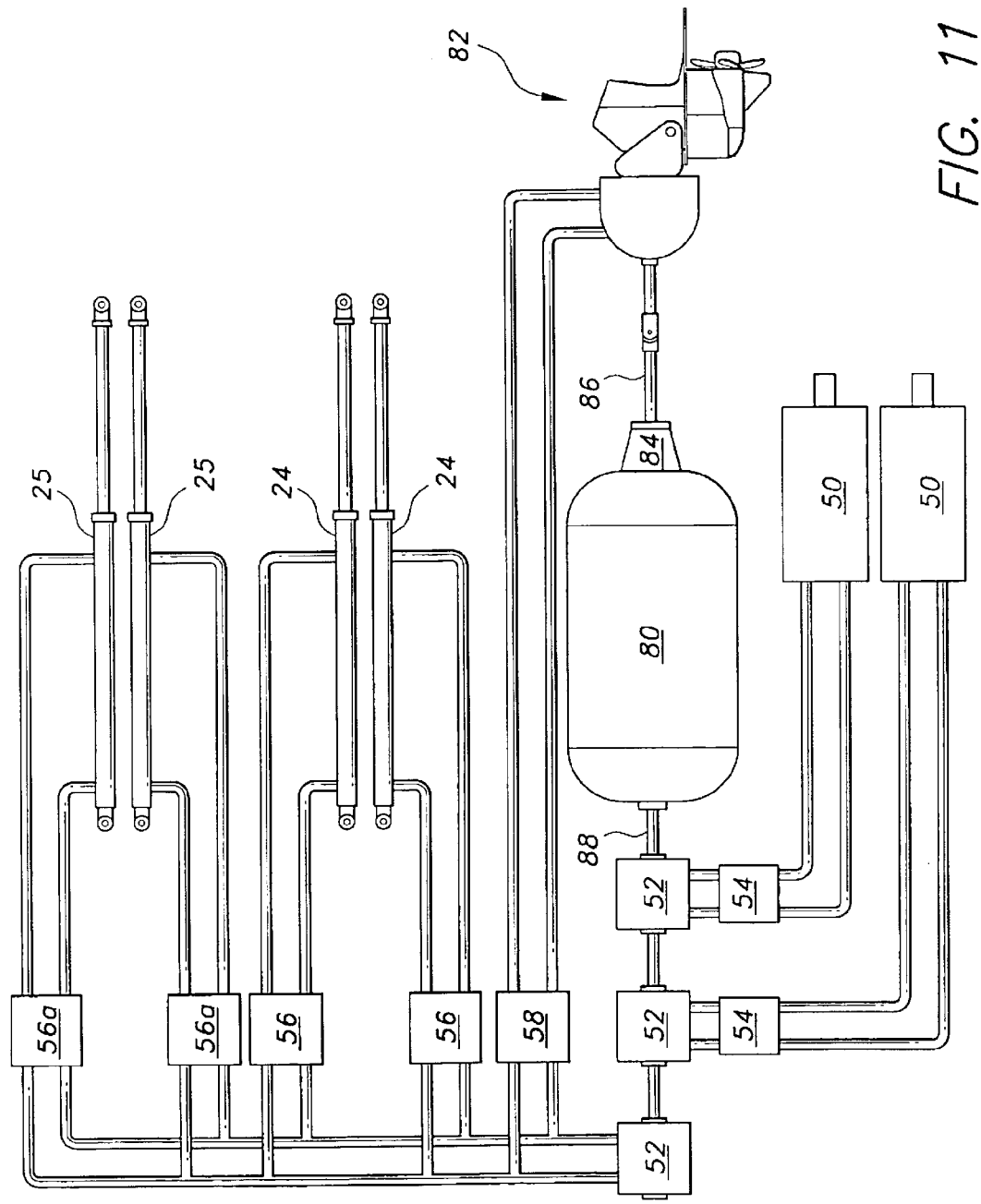
FIG. 11 is a schematic diagram of the power and hydraulic system of the amphibious vehicle according to the present invention.

Turning now to FIG. 11, a conventional internal combustion engine 80 provides power for the amphibious vehicle. The engine 80 drives the marine outdrive 82 through a marine clutch 84 and a drive shaft 86. The marine clutch 84 is disposed between the engine 80 and the marine outdrive 82 so that the outdrive 82 can be disengaged from the engine 80 during land operation and engaged for marine operation.

A hydraulic system powers the hydraulic motors 50, and operates auxiliary equipment including the hydraulic rams 24. The hydraulic system includes three hydraulic pumps 52. The hydraulic pumps 52 are driven by a power take-off shaft 88 that projects forward from the front of the engine 80. Two of the hydraulic pumps 52 are dedicated to the hydraulic motors 50, with a single hydraulic pump 52 connected to each of the hydraulic motors 50. Motor control valves 54 control the flow of hydraulic fluid to the hydraulic motors 50, and allow the hydraulic motors 50 to be operated in forward and reverse directions. The third hydraulic pump 52 is used for the operation of the hydraulic rams 24, and may also operate a lifting mechanism for the outdrive propeller, a winch, and additional auxiliary equipment. Ram control valves 56 control the flow of hydraulic fluid to the hydraulic rams 24, and allow the hydraulic rams 24 to be operated to raise and lower the track assemblies 30. Ram control valves 56a control the flow of hydraulic fluid to the hydraulic rams 25, and allow the hydraulic rams 25 to be operated in conjunction with the hydraulic rams 24. Additionally, an outdrive tilt control valve 58 may be provided to control the flow of hydraulic fluid to the outdrive 82 to raise and lower the outdrive propeller.

It is to be understood that the present invention is not limited to the embodiment described above, but encompasses any and all embodiments within the scope of the following claims.

I claim:

1. An amphibious vehicle, comprising:
   a hull having opposing first and second sides, a bow, and a stern;
   a plurality of hinges disposed along each of said first and second sides;
   first and second track drive assemblies, each of said track drive assemblies having longitudinal inboard and outboard top edges, the track drive assemblies being attached to the first and second sides of said hull by said hinges, wherein each of the track drive assemblies is rotatable through an arc of rotation about a longitudinal axis generally parallel to said longitudinal inboard top edge between a downward position and an upright position;

a support frame disposed on said hull and extending above said hull; and first and second lift mechanisms disposed between said support frame and said first and second track drive assemblies, respectively.

2. The amphibious vehicle according to claim 1, wherein said plurality of hinges comprises a plurality of offset hinges, each of the track drive assemblies being rotatable about a longitudinal axis generally parallel to said longitudinal inboard top edge and between said longitudinal inboard top edge and said longitudinal outboard top edge.

3. The amphibious vehicle according to claim 1, wherein each of said lift mechanisms comprises a lifting member having a first end and a second end, the first end being supported above said hull and the second end being connected to said track drive assembly.

4. The amphibious vehicle according to claim 3, wherein said lifting member is a hydraulic ram.

5. The amphibious vehicle according to claim 3, wherein each of said lift mechanisms further comprises a pulling member having a first end and a second end, the first end being supported above said hull and below said first end of said lifting member, and the second end being connected to said lifting member.

6. The amphibious vehicle according to claim 5, wherein said pulling member is a hydraulic ram.

7. The amphibious vehicle according to claim 1, wherein each of said track drive assemblies further comprises:

a frame having an inboard and an outboard support member, each of the support members having and inner surface and an outer surface, the frame having a first end and a second end;

a hydraulically driven drum supported between the inboard and outboard support members at said first end of said frame;

an idler supported by the second end of said frame;

a plurality of road wheels supported by said frame, the road wheels being disposed in line between the hydraulically driven drum and the idler; and an endless belt track member entrained about said hydraulically driven drum, said idler, and said wheels.

8. The amphibious vehicle according to claim 7, wherein each said hydraulically driven drum comprises:

a motor support disposed on the inner surface of said inboard support member;

a hydraulic motor supported by said motor support, the hydraulic motor having a motor shaft;

a bearing disposed on the inner surface of said outboard support member;

a cylindrical drum; and a hub attached to said cylindrical drum, the hub having a hub shaft rotatably supported by said bearing, the motor shaft engaging said hub;

whereby said cylindrical drum rotates when the motor shaft rotates.

9. The amphibious vehicle according to claim 7, further comprising:

a marine outdrive disposed on said stern of said hull;

an internal combustion engine disposed within said hull, the internal combustion engine being coupled to said marine outdrive; and a plurality of hydraulic pumps, the hydraulic pumps being coupled to said internal combustion engine, at least one of the hydraulic pumps being in communication with said hydraulic motors, and at least one of said hydraulic pumps being in communication with said first and second lift mechanisms.

10. A drive track assembly, comprising:

a frame having an inboard and an outboard support member, each of the support members having and inner surface and an outer surface, the frame having a first end and a second end;

a hydraulically driven drum supported between the inboard and outboard support members at said first end of said frame, the hydraulically driven drum comprising a motor support disposed on the inner surface of said inboard support member, a hydraulic motor supported by said motor support, the hydraulic motor having a motor shaft, a bearing disposed on the inner surface of said outboard support member, a cylindrical drum, and a hub attached to said cylindrical drum, the hub having hub shaft rotatably supported by said bearing, the motor shaft engaging said hub;

an idler supported by the second end of said frame;

a plurality of road wheels supported by said frame, the road wheels being disposed in line between the hydraulically driven drum and the idler; and an endless belt track member entrained about said hydraulically driven drum, said idler, and said wheels.

11. An amphibious vehicle, comprising:

a hull having opposing first and second sides, a bow, and a stern;

a plurality of hinges disposed along each of said first and second sides;

first and second track drive assemblies, each of said track drive assemblies having longitudinal inboard and outboard top edges, the track drive assemblies being attached to the first and second sides of said hull by said hinges, wherein each of the track drive assemblies is rotatable through an arc of rotation about a longitudinal axis generally parallel to said longitudinal inboard top edge between a downward position and an upright position; and first and second lift mechanisms disposed between said hull and said first and second track drive assemblies, respectively;

wherein each of said track drive assemblies comprises a frame having an inboard and an outboard support member, each of the support members having and inner surface and an outer surface, the frame having a first end and a second end; a hydraulically driven drum supported between the inboard and outboard support members at said first end of said frame; an idler supported by the second end of said frame; a plurality of road wheels supported by said frame, the road wheels being disposed in line between the hydraulically driven drum and the idler; and an endless belt track member entrained about said hydraulically driven drum, said idler, and said wheels.

12. The amphibious vehicle according to claim 11, wherein said plurality of hinges comprises a plurality of offset hinges, each of the track drive assemblies being rotatable about a longitudinal axis generally parallel to said longitudinal inboard top edge and between said longitudinal inboard top edge and said longitudinal outboard top edge.

13. The amphibious vehicle according to claim 11, further comprising a support frame disposed on said hull and extending above said hull, said first and second lift mechanisms being disposed between said support frame and said first and second track drive assemblies, respectively.

14. The amphibious vehicle according to claim 11, wherein each of said lift mechanisms comprises a lifting member having a first end and a second end, the first end being supported above said hull and the second end being connected to said track drive assembly.

15. The amphibious vehicle according to claim 14, wherein said lifting member is a hydraulic ram.

16. The amphibious vehicle according to claim 14, wherein each of said lift mechanisms further comprises a pulling member having a first end and a second end, the first end being supported above said hull and below said first end of said lifting member, and the second end being connected to said lifting member.

17. The amphibious vehicle according to claim 16, wherein said pulling member is a hydraulic ram.

18. The amphibious vehicle according to claim 11, further comprising:

a marine outdrive disposed on said stern of said hull;

an internal combustion engine disposed within said hull, the internal combustion engine being coupled to said marine outdrive; and a plurality of hydraulic pumps, the hydraulic pumps being coupled to said internal combustion engine, at least one of the hydraulic pumps being in communication with said hydraulic motors, and at least one of said hydraulic pumps being in communication with said first and second lift mechanisms.

* * * * *